(12) United States Patent
Horiuchi (10) Patent No.: US 11,724,428 B2
(45) Date of Patent: Aug. 15, 2023

(54) CONTROL DEVICE AND CONTROL METHOD FOR INJECTION MOLDING MACHINE

(71) Applicant: FANUC CORPORATION, Minamitsuru-gun (JP)

(72) Inventor: Atsushi Horiuchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 143 days.

(21) Appl. No.: 17/010,594

(22) Filed: Sep. 2, 2020

(65) Prior Publication Data
US 2021/0069957 A1 Mar. 11, 2021

(30) Foreign Application Priority Data
Sep. 6, 2019 (JP) .................................. 2019-162624

(51) Int. Cl.
*B29C 45/77* (2006.01)
*B29C 45/18* (2006.01)

(52) U.S. Cl.
CPC .......... *B29C 45/77* (2013.01); *B29C 45/1808* (2013.01); *B29C 2945/76006* (2013.01);
(Continued)

(58) Field of Classification Search
CPC ............... B29C 45/77; B29C 45/1808; B29C 2945/76006; B29C 2945/76187;
(Continued)

(56) References Cited

U.S. PATENT DOCUMENTS 6,340,439 B1* 1/2002 Hiraoka ................. B29C 45/47
264/40.5
2003/0108640 A1* 6/2003 Nishizawa .......... B29C 45/5008
425/587
(Continued)

FOREIGN PATENT DOCUMENTS

JP  H10-016016 A  1/1998
JP  2000-313044 A  11/2000
(Continued)

OTHER PUBLICATIONS

Japanese Decision to Grant a Patent dated Feb. 28, 2023, in corresponding Japanese Patent Application No. 2019-162624, with an English translation thereof.

*Primary Examiner* — Matthew J Daniels
*Assistant Examiner* — Gregory C. Grosso
(74) *Attorney, Agent, or Firm* — McGinn I.P. Law Group, PLLC (57) ABSTRACT

A control device for an injection molding machine is equipped with a pressure acquisition unit that acquires a pressure of a resin inside a cylinder, a reverse rotation control unit that causes a screw to be rotated in reverse based on a predetermined reverse rotation condition so as to reduce the resin pressure after having moved the screw rearward to a metering position, a compensation amount calculation unit that calculates a compensation amount to be made with respect to the reverse rotation condition, based on the resin pressure inside the cylinder acquired by the pressure acquisition unit when the reverse rotation of the screw is stopped, and a predetermined compensation function, and a compensation processing unit configured to compensate the reverse rotation condition based on the compensation amount calculated by the compensation amount calculation unit.

16 Claims, 8 Drawing Sheets

(52) U.S. Cl.
CPC ............ *B29C 2945/76187* (2013.01); *B29C 2945/76354* (2013.01); *B29C 2945/76568* (2013.01); *B29C 2945/76605* (2013.01); *B29C 2945/76665* (2013.01); *B29C 2945/76846* (2013.01); *B29C 2945/76939* (2013.01)

(58) Field of Classification Search
CPC ........... B29C 2945/76354; B29C 2945/76568; B29C 2945/76605; B29C 2945/76665; B29C 2945/76846; B29C 2945/76939; B29C 2045/5096
USPC ....................................................... 264/40.3
See application file for complete search history.

(56) References Cited

U.S. PATENT DOCUMENTS

| | | | |
|---|---|---|---|
| 2004/0091567 A1 | 5/2004 | Watanabe et al. | |
| 2004/0096534 A1 | 5/2004 | Shiraishi et al. | |
| 2004/0140579 A1* | 7/2004 | Uwaji | B29C 45/7693 264/40.5 |
| 2008/0065343 A1* | 3/2008 | Shiozawa | B29C 45/76 702/113 |
| 2008/0150181 A1 | 6/2008 | Maruyama et al. | |

FOREIGN PATENT DOCUMENTS

| | | |
|---|---|---|
| JP | 2004-154994 A | 6/2004 |
| JP | 2004-155162 A | 6/2004 |
| JP | 2004-255588 A | 9/2004 |
| JP | 2006-142739 A | 6/2006 |
| JP | 2007-237498 A | 9/2007 |
| JP | 2008-155600 A | 7/2008 |
| JP | 2010-005840 A | 1/2010 |
| JP | 2012-254536 A | 12/2012 |
| JP | 2014-058066 A | 4/2014 |

* cited by examiner

| RESIN PRESSURE | COMPENSATION FUNCTION |
|---|---|
| $x > \alpha$ | $y = f(x)$ |
| $\beta \leq x \leq \alpha$ FOR LESS THAN ONE SECOND | $y = 0$ (NO COMPENSATION) |
| $\beta \leq x \leq \alpha$ FOR GREATER THAN OR EQUAL TO ONE SECOND | $y = g(x)$ |
| $x < \beta$ | $y = h(x)$ |

FIG. 8A
SCREW BACKWARD MOVEMENT SPEED

FIG. 8B
SCREW ROTATIONAL SPEED

FIG. 8C
RESIN PRESSURE

FIG. 8D
RESIN PRESSURE

FIG. 8E
RESIN PRESSURE

US 11,724,428 B2

CONTROL DEVICE AND CONTROL METHOD FOR INJECTION MOLDING MACHINE

CROSS-REFERENCE TO RELATED APPLICATION

This application is based upon and claims the benefit of priority from Japanese Patent Application No. 2019-162624 filed on Sep. 6, 2019, the contents of which are incorporated herein by reference.

BACKGROUND OF THE INVENTION

Field of the Invention

The present invention relates to a control device and a control method for an injection molding machine.

Description of the Related Art

In Japanese Laid-Open Patent Publication No. 2014-058066, it is disclosed that, if a predetermined injection material is measured by a metering process, the rotation of a screw is stopped, and the screw is rotated in reverse under a condition in which an axial position of the screw is maintained. According to Japanese Laid-Open Patent Publication No. 2014-058066, an angle of rotation required for a reverse flow of a volume equivalent to the volume of an injection material corresponding to the closing stroke of a check ring is calculated, and by using the calculated angle of rotation as the angle of rotation when the screw is rotated in reverse, variations in metering are reduced.

SUMMARY OF THE INVENTION

However, in Japanese Laid-Open Patent Publication No. 2014-058066, the amount of rotation when the screw is rotated in reverse cannot always be set appropriately. For example, in the case that air enters through a nozzle from the exterior of the cylinder into the interior of the cylinder, there may be cases in which a satisfactory molded product cannot be obtained.

An object of the present invention is to provide a control device and a control method for an injection molding machine, which enable a satisfactory molded article to be obtained.

A control device for an injection molding machine according to one aspect of the present invention is characterized by a control device for an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the control device including a pressure acquisition unit configured to acquire a resin pressure inside the cylinder, a reverse rotation control unit configured to cause the screw to be rotated in reverse based on a predetermined reverse rotation condition so as to reduce the resin pressure, after having moved the screw rearward to the metering position, a compensation amount calculation unit configured to calculate a compensation amount to be made with respect to the reverse rotation condition, based on the resin pressure inside the cylinder acquired by the pressure acquisition unit when the reverse rotation of the screw is stopped, and a predetermined compensation function, and a compensation processing unit configured to compensate the reverse rotation condition based on the compensation amount calculated by the compensation amount calculation unit.

A control method for an injection molding machine according to another aspect of the present invention is characterized by a method of controlling an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the method including a step of causing the screw to be rotated in reverse based on a predetermined reverse rotation condition so as to reduce a resin pressure, after having moved the screw rearward to the metering position, a step of acquiring the resin pressure inside the cylinder when the reverse rotation of the screw is stopped, a step of calculating a compensation amount to be made with respect to the reverse rotation condition, based on the resin pressure inside the cylinder acquired when the reverse rotation of the screw is stopped, and a predetermined compensation function, and a step of compensating the reverse rotation condition based on the calculated compensation amount.

According to the present invention, it is possible to provide a control device and a control method for an injection molding machine, which enable a satisfactory molded article to be obtained.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a control device and a control method for an injection molding machine according to the present invention will be presented and described in detail below with reference to the accompanying drawings.

EMBODIMENT

Figure 1:
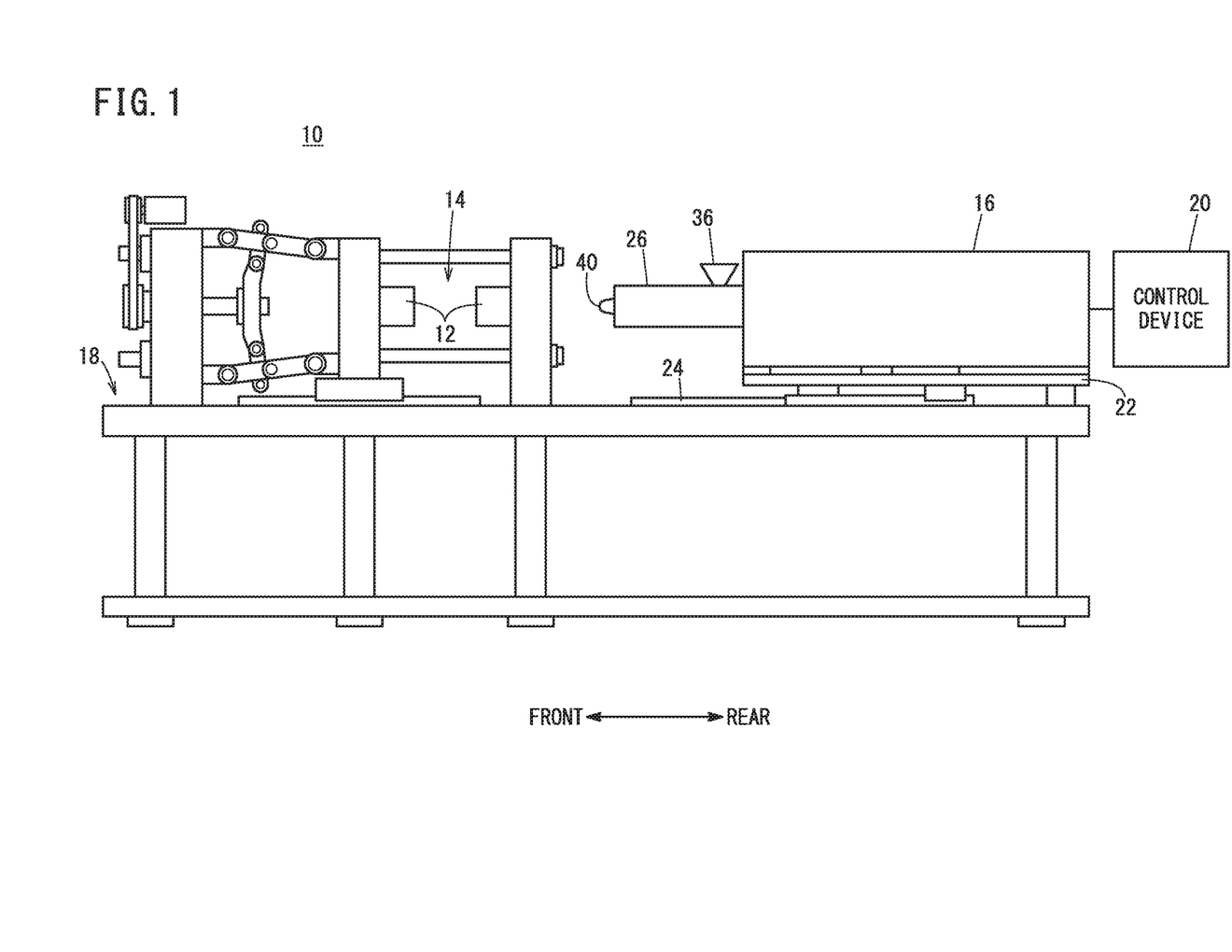
FIG. 1 is a side view showing an injection molding machine according to an embodiment of the present invention.

A control device and a control method for an injection molding machine according to one embodiment will be described with reference to FIGS. 1 to 8E. FIG. 1 is a side view showing an injection molding machine according to the present embodiment. In order to facilitate description, the left side of the paper surface in FIG. 1 will be regarded as a front direction, and the right side of the paper surface in FIG. 1 will be regarded as a rear direction.

As shown in FIG. 1, the injection molding machine 10 comprises a mold clamping unit 14 equipped with a mold 12 that is configured to be opened and closed, and an injection unit 16 that faces toward the mold clamping unit 14 in a front-rear direction. The mold clamping unit 14 and the injection unit 16 are supported by a machine base 18. A control device 20 that controls the injection unit 16 is further provided in the injection molding machine 10.

The mold clamping unit 14 and the machine base 18 can be configured based on a known technique. Therefore, in the following, descriptions of the mold clamping unit 14 and the machine base 18 will be appropriately omitted.

Prior to describing the control device 20 of the injection molding machine according to the present embodiment, the injection unit 16, which is a control target of the control device 20, will be described below.

The injection unit 16 is supported by a base 22. The base 22 is supported by a guide rail 24 installed on the machine base 18 so as to be capable of moving forward and rearward. Therefore, the injection unit 16 is configured to move forward and rearward on the machine base 18, and can both come into contact with and separate away from the mold clamping unit 14.

Figure 2:
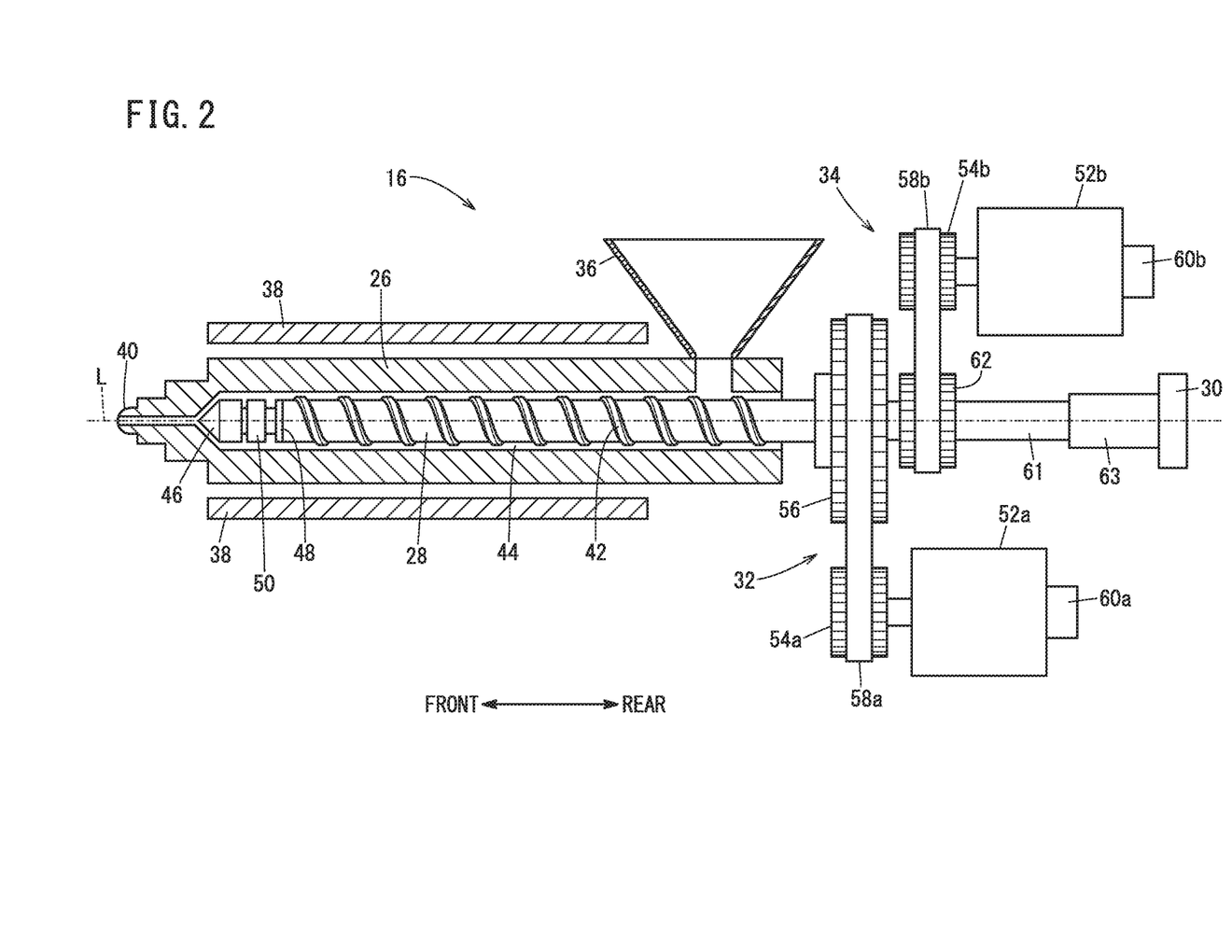
FIG. 2 is a schematic drawing showing an injection unit provided in the injection molding machine according to the embodiment.

FIG. 2 is a schematic drawing showing the injection unit provided in the injection molding machine according to the present embodiment.

The injection unit 16 is equipped with a tubular-shaped heating cylinder (cylinder) 26. A screw 28 is provided inside the cylinder 26. A first drive device 32 and a second drive device 34 are connected to the screw 28.

An axial line of the cylinder 26 and an axial line of the screw 28 coincide with each other on an imaginary line L. Such a system may be referred to as an in-line (in-line screw) system. The injection molding machine to which the in-line system is applied is referred to as an in-line injection molding machine.

As advantages of such an in-line injection molding machine, there may be cited, for example, a point in which the structure of the injection unit 16 is simpler, and a point in which the maintainability thereof is excellent, as compared with other types of injection molding machines. Other types of injection molding machines include, for example, a preplasticating type injection molding machine.

As shown in FIG. 2, a hopper 36 is provided on a rear side of the cylinder 26. The hopper 36 is equipped with a supply port for supplying a molding material resin to the cylinder 26. A heater 38 for heating the cylinder 26 is provided along the cylinder 26. A nozzle 40 is provided on a front side of the cylinder 26. An injection port for injecting the resin into the cylinder 26 is provided on the nozzle 40.

The screw 28 is equipped with a spiral flight part 42 that spans across the longitudinal (front-rear) direction thereof. The flight part 42, together with the inner wall of the cylinder 26, constitutes a spiral flow path 44. The spiral flow path 44 guides, in a frontward direction, the resin that is supplied from the hopper 36 to the cylinder 26.

A screw head 46 is provided on a front-side end of the screw 28. A check seat 48 is further provided on the screw 28. The check seat 48 is disposed at a distance in a rearward direction with respect to the screw head 46. A check ring (a ring for backflow-prevention) 50 is further provided on the screw 28. The check ring 50 is capable of moving back and forth between the screw head 46 and the check seat 48.

The check ring 50 moves in a frontward direction relative to the screw 28 when the check ring receives a forward pressure from the resin located on a rear side of the check ring 50. Further, the check ring 50 moves in a rearward direction relative to the screw 28 when the check ring receives a rearward pressure from the resin located on the front side of the check ring 50.

In a metering, to be described later, the resin, which is supplied from the hopper 36 to the supply port of the cylinder 26, is fed and compressed in a frontward direction by forward rotation of the screw 28 while being melted along the flow path 44. Therefore, the pressure on the rear side of the check ring 50 becomes greater than the pressure on the front side of the check ring 50. When this occurs, the check ring 50 moves in the frontward direction relative to the screw 28, and the flow path 44 is gradually opened accompanying such movement. Consequently, the resin becomes capable of flowing toward the front side beyond the check seat 48 along the flow path 44.

In the injection process, to be described later, the pressure on the front side of the check ring 50 becomes greater than the pressure on the rear side of the check ring 50. When this occurs, the check ring 50 moves in the rearward direction relative to the screw 28, and the flow path 44 is gradually closed accompanying such movement. When the check ring 50 is moved rearward until being seated on the check seat 48, a state is brought about in which it is maximally difficult for the resin to flow forward and rearward of the check ring 50, and a situation is prevented in which the resin on a more frontward side than the check seat 48 flows in reverse to a more rearward side than the check seat 48.

The screw 28 is equipped with a pressure sensor 30. The pressure sensor 30 sequentially detects the pressure imposed on the resin inside the cylinder 26. As the pressure sensor 30, there may be used, for example, a load cell, however the present invention is not limited to this feature. The pressure that is applied to the resin inside the cylinder 26 may also be referred to as a back pressure, or alternatively, a resin pressure.

The first drive device 32 is configured to rotate the screw 28 inside the cylinder 26. The first drive device 32 is equipped with a servomotor 52*a*. The first drive device 32 is further equipped with a drive pulley 54*a* that rotates integrally with a rotary shaft of the servomotor 52*a*. The first drive device 32 is further equipped with a driven pulley 56 that is provided integrally on the screw 28. The first drive device 32 is further equipped with a belt member 58*a* that transmits a rotational force of the servomotor 52*a* from the drive pulley 54*a* to the driven pulley 56.

When the rotary shaft of the servomotor 52*a* rotates, the rotational force of the servomotor 52*a* is transmitted to the screw 28 via the drive pulley 54*a*, the belt member 58*a*, and the driven pulley 56. Consequently, the screw 28 rotates.

In this manner, by causing the rotary shaft of the servomotor 52*a* to rotate, the first drive device 32 is configured to rotate the screw 28. Moreover, the direction in which the screw 28 is rotated can be switched between forward rotation and reverse rotation by changing the direction of rotation of the rotary shaft of the servomotor 52a.

A sensor 60a is provided on the servomotor 52a. The sensor 60a is capable of detecting the rotational position and the rotational speed of the rotary shaft of the servomotor 52a. Such a sensor 60a may also be referred to as a position/speed sensor. The sensor 60a supplies a detection result to the control device 20. The control device 20 is configured to calculate the amount of rotation, the rotational acceleration, and the rotational speed of the screw 28, etc., based on the rotational position and the rotational speed detected by the sensor 60a.

The second drive device 34 is configured to cause the screw 28 to be moved forward and rearward (backward). The second drive device 34 is equipped with a servomotor 52b. The second drive device 34 is further equipped with a drive pulley 54b that rotates integrally with a rotary shaft of the servomotor 52b. The second drive device 34 is further equipped with a ball screw 61. An axial line of the ball screw 61 and an axial line of the screw 28 coincide with each other on the imaginary line L. The second drive device 34 is further equipped with a driven pulley 62 that is fixed to the ball screw 61. The second drive device 34 is further equipped with a belt member 58b that transmits a rotational force of the servomotor 52b from the drive pulley 54b to the driven pulley 62. A nut 63 that is screw-engaged with the ball screw 61 is further provided on the second drive device 34.

When a rotational force is transmitted from the belt member 58b, the ball screw 61 converts the rotational force into linear motion, and transmits the linear motion to the screw 28. Consequently, the screw 28 is moved forward and rearward.

In this manner, by causing the rotary shaft of the servomotor 52b to rotate, the second drive device 34 is configured to move the screw 28 forward and rearward. Moreover, by changing the direction in which the rotary shaft of the servomotor 52b is rotated, the moving direction of the screw 28 can be switched between forward movement (advancing) and rearward movement (retracting).

A sensor 60b is provided on the servomotor 52b. As the sensor 60b, there may be used the same sensor as the sensor 60a described above, however the present invention is not limited to this feature. The control device 20 is configured to calculate a position of forward movement and a position of rearward movement of the screw 28 in the front-rear direction, based on the rotational position and the rotational speed detected by the sensor 60b. Further, the control device 20 is configured to calculate a forward movement speed and a rearward (backward) movement speed of the screw 28, based on the rotational position and the rotational speed detected by the sensor 60b.

When the screw 28 is forwardly rotated while introducing the resin into the interior of the cylinder 26 through the hopper 36, the resin is gradually compressed and fed in the frontward direction along the flow path 44. At this time, the resin is melted (plasticized) by being subjected to heating by the heater 38 and the rotation of the screw 28. The molten resin accumulates in a region located at a position on the front side with respect to the check seat 48 within the region inside the cylinder 26. The region on the front side with respect to the check seat 48 within the region inside the cylinder 26 may be referred to as a metering region.

The forward rotation of the screw 28 is initiated from a state in which the screw 28 has been completely advanced inside the cylinder 26 (a state in which the volume of the metering region is at a minimum), and is performed until the screw 28 moves rearward to a predetermined position (metering position). The rearward movement of the screw 28 is performed while maintaining the back pressure at a predetermined value (metering pressure) P1. More specifically, the rearward movement of the screw 28 is carried out while the servomotor 52b is feedback-controlled (back pressure controlled) on the basis of the pressure detected by the pressure sensor 30, in a manner so that the back pressure applied to the resin becomes the metering pressure P1. Such a process may be referred to as a metering (metering step).

By setting the position of the screw 28 to the metering position by causing the screw 28 to be moved rearward while controlling the rearward movement of the screw 28 so as to maintain the back pressure during metering at the metering pressure P1, it is possible to keep the volume of the metering region and the density of the resin substantially constant at each metering.

However, inertia is generated in the servomotor 52a that causes the screw 28 to rotate, the drive pulley 54a that transmits the rotational force of the servomotor 52a, the belt member 58a, and the driven pulley 56. Therefore, even if the rotation of the screw 28 is made to stop, the screw 28 cannot be stopped instantaneously due to the influence of such inertia. For this reason, a time lag occurs from the arrival of the screw 28 at the metering position and until the forward rotation of the screw 28 comes to a stop. During such a time lag as well, the resin is continuously fed and compressed from the rearward direction toward the frontward direction. Furthermore, even after the forward rotation of the screw 28 has been stopped, due to the influence of viscous resistance of the molten resin, the flow of the resin from the rearward direction toward the frontward direction is not stopped instantaneously, and the resin continues to be fed and compressed for a while. Due to the above factors, the amount of resin accumulated in the metering region actually tends to be greater than an amount (appropriate amount) of the resin required for satisfactory molding. When the amount of the resin accumulated in the metering region becomes greater than the appropriate amount, the mass of the manufactured molded product may become uneven, which can be a primary cause of molding defects.

After the screw 28 has arrived at the metering position, the screw 28 is rotated in reverse in order to reduce the back pressure. Such a process may be referred to as a reduction in pressure (pressure reducing step). At a time after completion of the pressure reducing step, it is preferable that the back pressure be brought in close proximity to zero (target pressure P0).

In the case that the reduction in pressure is excessive, air is drawn in from the nozzle 40 into the interior of the cylinder 26, and air bubbles become mixed in the resin inside the cylinder 26. An excessive reduction in pressure can occur, for example, in the case that the amount of reduction in pressure during reverse rotation of the screw 28 or the like is excessive. More specifically, an excessive reduction in pressure may take place in the case that the amount of rotation when the screw 28 is rotated in reverse is excessive. Further, the excessive reduction in pressure may also occur in the case that the vigorousness of the reduction in pressure is excessive. For example, an excessive reduction in pressure may occur in the case that the rotational speed of the screw 28 is too fast. When molding is performed using a resin with air bubbles mixed therein, an unevenness occurs in the mass of the molded product obtained by such molding, which can be a primary cause of poor appearance, poor product quality, and the like.

In the case that the pressure is not sufficiently reduced, a phenomenon referred to as "drawling" occurs, in which molten resin leaks from the tip end of the nozzle 40. Accordingly, ideally, the reduction in pressure is executed so as to prevent drawling, while also preventing air bubbles from becoming mixed into the resin that is accumulated inside the cylinder 26.

After having carried out the metering step and the pressure reducing step, in order to fill a cavity inside the mold 12 with the resin that has accumulated in the metering region inside the cylinder 26, the screw 28 is advanced in a state in which the mold 12 and the nozzle 40 are pressed into contact (placed in a nozzle touching state). As a result, the molten resin is injected from the tip end of the nozzle 40 into the mold 12. This series of processes may be referred to as injection (injection step). After having performed injection of the resin, a process referred to as mold opening (mold opening step) is performed in which the mold 12 in the mold clamping unit 14 is opened, whereby the resin filled in the cavity is taken out from the mold 12 in the form of a molded product. After having carried out the mold opening step, a process referred to as mold closing (mold closing step) is performed in which the mold 12 in the mold clamping unit 14 is closed in preparation for a subsequent molding.

In this manner, the metering step, the pressure reducing step, the injection step, the mold opening step, and the mold closing step are sequentially performed in the order described above. Such a sequential process flow may be referred to as a molding cycle. By repeatedly executing the molding cycle, the injection molding machine 10 is capable of mass producing molded products.

The control device 20 is capable of executing at least the pressure reducing step from among the plurality of steps included in the molding cycle. A description will be given below concerning the configuration of the control device 20 of the injection molding machine according to the present embodiment.

Figure 3:
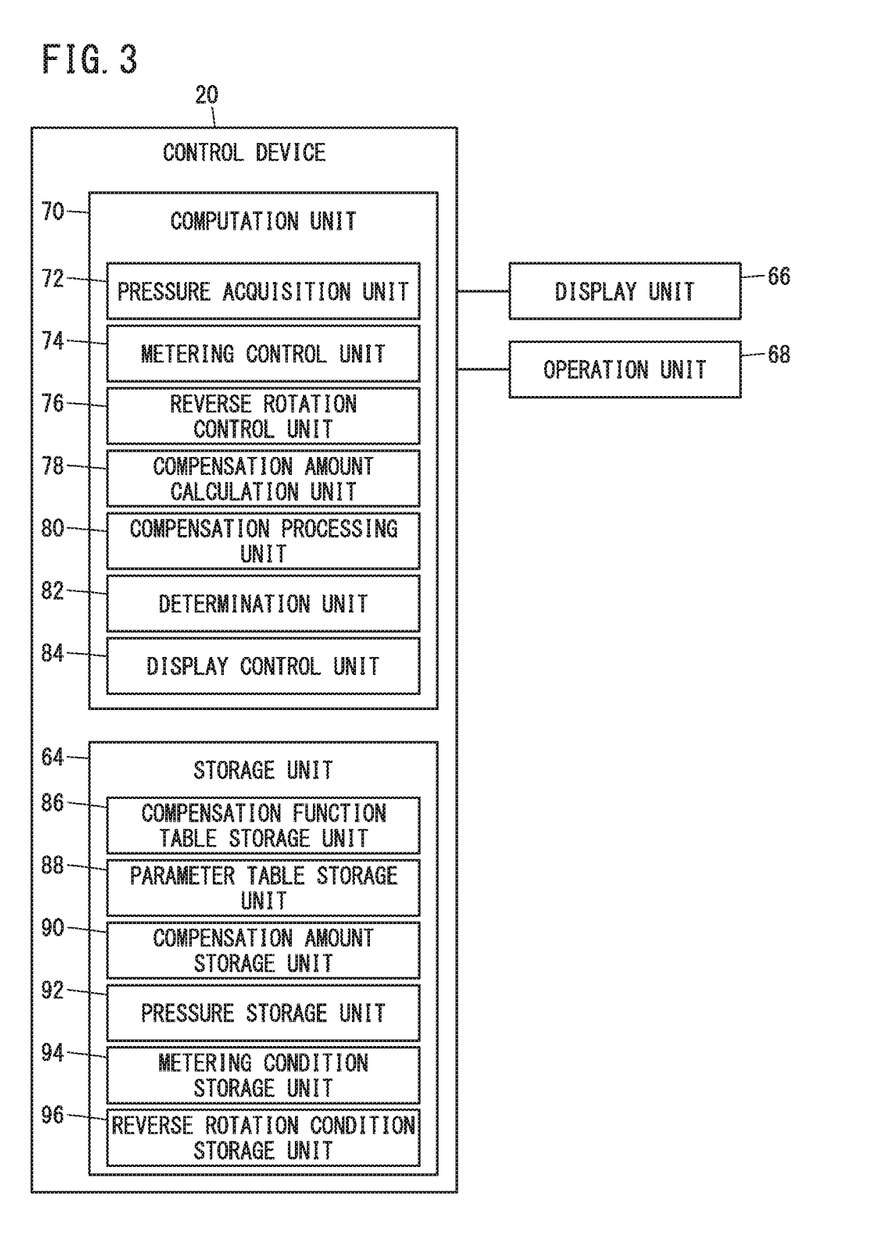
FIG. 3 is a block diagram showing a control device of the injection molding machine according to the embodiment.

FIG. 3 is a block diagram showing the control device of the injection molding machine according to the present embodiment.

The control device 20 is equipped with a computation unit 70 and a storage unit 64. The computation unit 70 may be configured by a processor such as a CPU (Central Processing Unit) or the like, however the present invention is not limited to this feature. The storage unit 64 includes a volatile memory and a nonvolatile memory, neither of which are shown. Examples of the volatile memory include a RAM or the like. Examples of the nonvolatile memory include a ROM, a flash memory, or the like. Programs, tables, etc., are stored, for example, in the nonvolatile memory.

The computation unit 70 comprises a pressure acquisition unit 72, a metering control unit 74, a reverse rotation control unit 76, a compensation amount calculation unit 78, a compensation processing unit 80, a determination unit 82, and a display control unit 84. The pressure acquisition unit 72, the metering control unit 74, the reverse rotation control unit 76, the compensation amount calculation unit 78, the compensation processing unit 80, the determination unit 82, and the display control unit 84 can be realized by programs which are stored in the storage unit 64 being executed by the computation unit 70.

A predetermined control program for controlling the injection unit 16 is stored in advance in the storage unit 64. Further, various information may be appropriately stored in the storage unit 64 when the control program is being executed. In the storage unit 64, there are provided a compensation function table storage unit 86, a parameter table storage unit 88, a compensation amount storage unit 90, a pressure storage unit 92, a metering condition storage unit 94, and a reverse rotation condition storage unit 96.

A display unit (display device) 66, and an operation unit (input device) 68 are connected to the control device 20.

The display unit 66 can be constituted, for example, by a liquid crystal display or the like, however the present invention is not limited to this feature. Various information can be displayed on the display unit 66. For example, later-described compensation amounts and the like may be displayed on the display unit 66.

The operation unit 68 can be constituted, for example, by a keyboard, a mouse, or the like, however the present invention is not limited to this feature. The operation unit 68 may be constituted by a non-illustrated touch panel provided on a screen of the display unit 66. A user is capable of issuing commands to the control device 20 via the operation unit 68.

The pressure acquisition unit 72 is configured to sequentially acquire the pressures acquired by the pressure sensor 30. The pressure acquisition unit 72 stores in the pressure storage unit 92 the pressures acquired using the pressure sensor 30. More specifically, the pressure acquisition unit 72 stores in the pressure storage unit 92 the pressures acquired using the pressure sensor 30, for example, in the form of time series data.

The metering control unit 74 performs the above-described metering on the basis of the metering conditions. A forward rotational speed (metering rotational speed) of the screw 28 during metering, the metering pressure P1, and the like are defined as such metering conditions. The metering conditions are stored in advance in the metering condition storage unit 94. Moreover, the metering conditions may be specified by the operator via the operation unit 68.

The metering control unit 74 causes the screw 28 to be moved rearward, while forwardly rotating the screw 28 until the screw 28 arrives at the metering position. At this time, the metering control unit 74 controls the first drive device 32, whereby the screw 28 is forwardly rotated at the metering rotational speed. Further, at this time, the metering control unit 74 controls the second drive device 34, whereby the rearward (backward) movement speed and the position of the screw 28 are controlled in a manner so that the back pressure becomes the metering pressure P1. When the screw 28 arrives at the metering position, the metering control unit 74 stops the forward rotation and the rearward movement of the screw 28, together with invoking operation of the reverse rotation control unit 76. As noted previously, there is a time lag from the arrival of the screw 28 at the metering position and until the forward rotation and the rearward movement of the screw 28 come to a stop.

The reverse rotation control unit 76 causes the screw 28 to be rotated in reverse based on a reverse rotation condition, after the forward rotation of the screw 28 has been stopped. Concerning the reverse rotation of the screw 28, the reverse rotation condition specifies at least one of an amount of rotation (angle of rotation) of the screw 28, a rotational acceleration of the screw 28, a rotational speed of the screw 28, and a time for which the screw 28 rotates. The reverse rotation condition is stored in advance, for example, in the reverse rotation condition storage unit 96, however the present invention is not limited to this feature. For example, the reverse rotation condition may be specified by the operator via the operation unit 68.

When the screw 28 is rotated in reverse, the resin on a more rearward side than the check seat 48 is scraped out along the spiral flow path 44 from the check seat 48 toward the side of the hopper 36 in an opposite direction to that at the time of metering. Consequently, the resin pressure on a more rearward side than the check seat 48 decreases. Further, at a point in time when the reverse rotation of the screw 28 is initiated, the check ring 50 is positioned on the side of the screw head 46, and therefore, the flow path 44 is open. Accordingly, by the screw 28 continuing to be rotated in reverse, the resin that is accumulated in the metering region passes through the check ring 50, and moves in a rearward direction (flows in reverse) from the frontward direction. As a result, the pressure imposed on the resin in the metering region is alleviated, and the back pressure is reduced. More specifically, by causing the resin to flow in reverse, the reverse rotation control unit 76 not only reduces the amount of resin that is accumulated in the metering region, but also reduces the back pressure.

After the reverse rotation of the screw 28 has been performed in this manner, the reverse rotation control unit 76 causes the reverse rotation of the screw 28 to be stopped.

The compensation amount calculation unit 78 is configured to calculate a compensation amount to be made with respect to the reverse rotation condition. More specifically, the compensation amount calculation unit 78 is configured to calculate such a compensation amount, on the basis of the resin pressure inside the cylinder 26 acquired by the pressure acquisition unit 72 when the reverse rotation of the screw 28 is stopped, and a predetermined compensation function. The compensation function, for example, is a polynomial function or a rational function, however the compensation function is not limited to such functions.

Figure 4A:
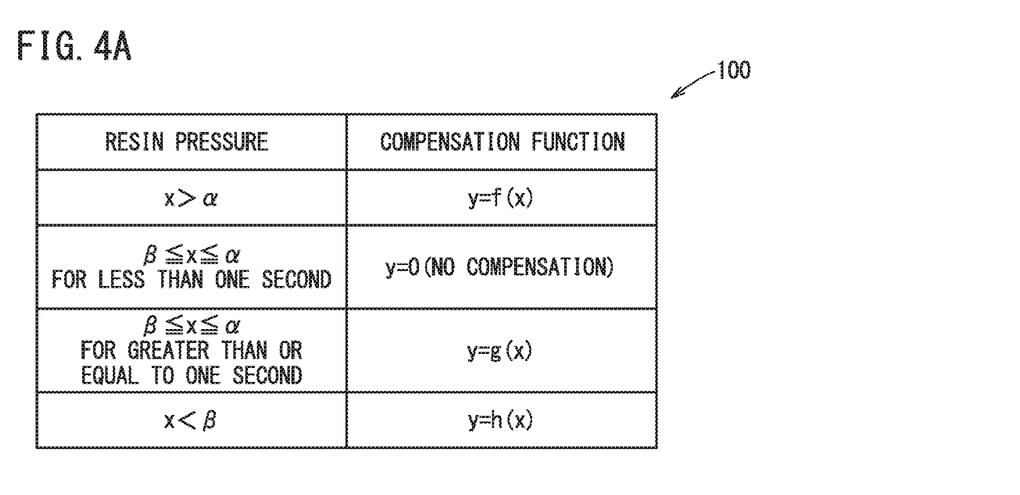
FIG. 4A and FIG. 4B are diagrams showing examples of a compensation function table.
Figure 4B:
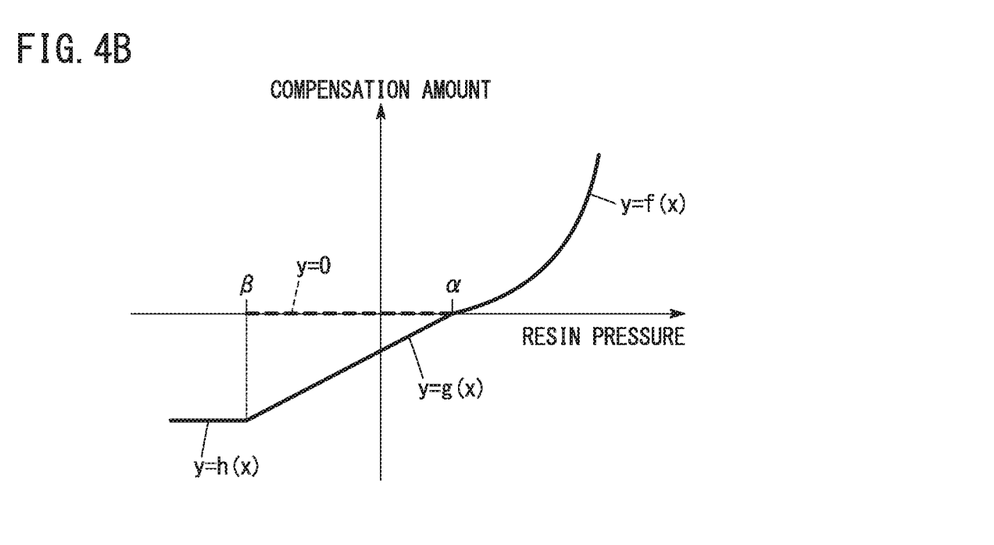

The determination unit 82 is configured to refer to a compensation function table 100. FIG. 4A and FIG. 4B are diagrams showing examples of the compensation function table. The compensation function table 100 is shown in FIG. 4A. The compensation function table 100 can be obtained in advance by experiment, for example. The compensation function table 100 can be stored in the compensation function table storage unit 86. The compensation function table 100 includes, for example, a resin pressure column and a compensation function column. Resin pressures are stored in the resin pressure column. Compensation functions corresponding to the resin pressures are stored in the compensation function column. The variable x indicates the resin pressure, the variable y indicates the compensation amount, and the variables $\alpha$ and $\beta$ indicate pressures of the resin that are determined in advance by experiment. In the example shown in FIG. 4A, in the case that the range of the resin pressure x in the pressure reducing step is $x > \alpha$, the compensation function is given by $y = f(x)$. Further, in the case that a condition of $\beta \leq x \leq \alpha$ occurs for less than one second, the compensation function is given by $y = 0$. More specifically, in such a case, the compensation amount is set to zero. In the case that the condition of $\beta \leq x \leq \alpha$ occurs for greater than or equal to one second, the compensation function is given by $y = g(x)$. In the case that $x < \beta$, the compensation function is given by $y = h(x)$. In FIG. 4B, a graph is shown indicating a relationship between the resin pressure and the compensation amount. The dashed line in FIG. 4B indicates a case in which the condition of $\beta \leq x \leq \alpha$ occurs for less than one second. The determination unit 82 is configured to determine one from among the plurality of compensation functions defined in the compensation function table 100 depending on the resin pressure.

Figure 5A:
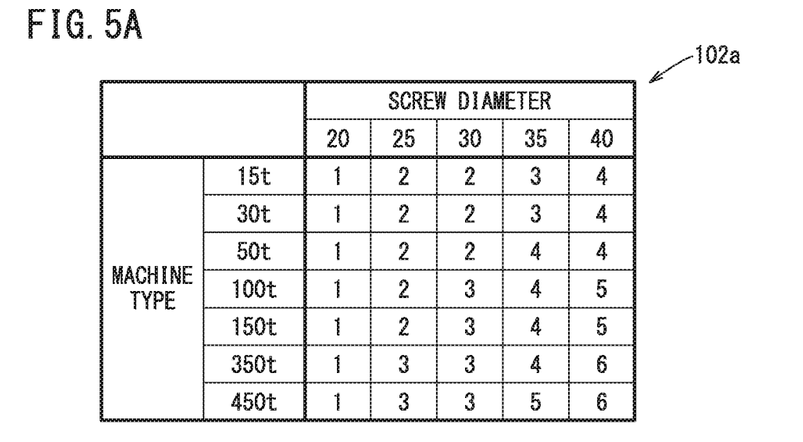
FIG. 5A and FIG. 5B are diagrams showing examples of a parameter table.
Figure 5B:
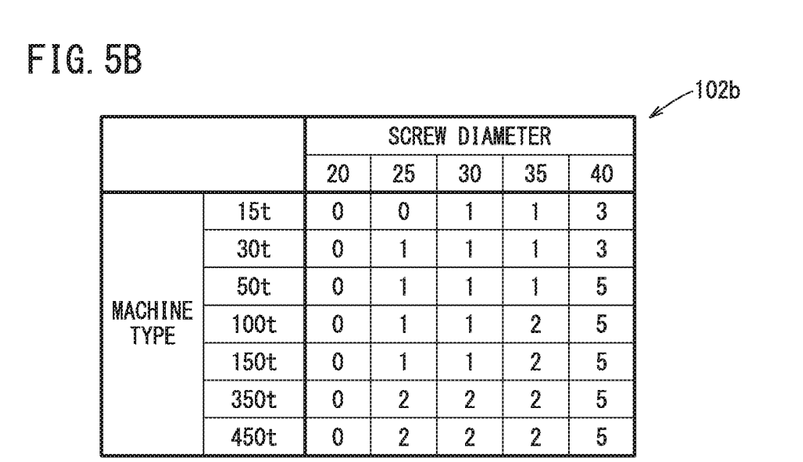

The determination unit 82 is configured to refer to the parameter tables 102a and 102b. FIG. 5A and FIG. 5B are diagrams showing examples of the parameter tables. Reference numeral 102 is used to describe the parameter tables in general, whereas reference numerals 102a and 102b are used to describe the individual parameter tables. The parameter tables 102 can be obtained in advance by experiment, for example. The parameter tables 102 can be stored in the parameter table storage unit 88. Examples for a case in which the compensation function is given by $y = Ax + B$ are shown in FIGS. 5A and 5B. Although the parameter tables 102 are provided for each of the compensation functions, in this instance, examples are shown of the parameter tables 102 for one from among the plurality of compensation functions. As noted previously, the variable x is the resin pressure, and the variable y is the compensation amount. The parameter table 102a is a table for the purpose of acquiring the parameter A. The parameter table 102b is a table for the purpose of acquiring the parameter B. In the parameter table 102a, the parameter A is defined depending on the machine type of the injection molding machine 10 and the diameter of the screw 28. Further, in the parameter table 102b, the parameter B is defined depending on the machine type of the injection molding machine 10 and the diameter of the screw 28. As can be understood from FIG. 5A, in the case that the machine type of the injection molding machine 10 is 30t, and the diameter of the screw 28 is 25 mm, the parameter A is 2. As can be understood from FIG. 5B, in the case that the machine type of the injection molding machine 10 is 30t, and the diameter of the screw 28 is 25 mm, the parameter B is 1. Since the parameter A is 2 and the parameter B is 1, the compensation function becomes $y = 2x + 1$. Moreover, in the above description, an example has been described for a case in which the parameters A and B, which depend on the machine type of the injection molding machine 10 and the diameter of the screw 28, are defined in the parameter tables 102, however, the present invention is not limited to this feature. For example, the parameters A and B, which depend only on the machine type of the injection molding machine 10, may be defined in the parameter tables 102. Further, the parameters A and B for the compensation function, which depend only on the diameter of the screw 28, may be defined in the parameter tables 102. In the foregoing manner, the determination unit 82 is configured to determine the compensation function using the parameters A and B, which depend on the machine type of the injection molding machine 10 or the diameter of the screw 28.

The compensation amount calculation unit 78 can calculate the compensation amount using the compensation function determined by the determination unit 82. The compensation processing unit 80 can carry out the compensation with respect to the reverse rotation condition, on the basis of the compensation amount calculated by the compensation amount calculation unit 78. The compensation amount calculated by the compensation amount calculation unit 78 can be stored in the compensation amount storage unit 90.

The compensation processing unit 80 is configured to determine the reverse rotation condition at a next time of injection molding in the following manner. For example, the compensation amount calculated by the compensation amount calculation unit 78 when a current time of injection molding is performed is stored in the compensation amount storage unit 90. Further, the reverse rotation condition at the current time of injection molding is stored in the reverse rotation condition storage unit 96. The compensation processing unit 80 reads out from the compensation amount storage unit 90 the compensation amount calculated by the compensation amount calculation unit 78 when the current time of injection molding is performed. Further, the compensation processing unit 80 reads out from the reverse rotation condition storage unit 96 the reverse rotation condition at the current time of injection molding. The compensation processing unit 80 is configured to determine, as the reverse rotation condition at the next time of injection molding, the reverse rotation condition obtained by compensating the reverse rotation condition at the current time of injection molding, based on the compensation amount stored in the compensation amount storage unit 90 when the current time of injection molding is performed.

Figure 6:
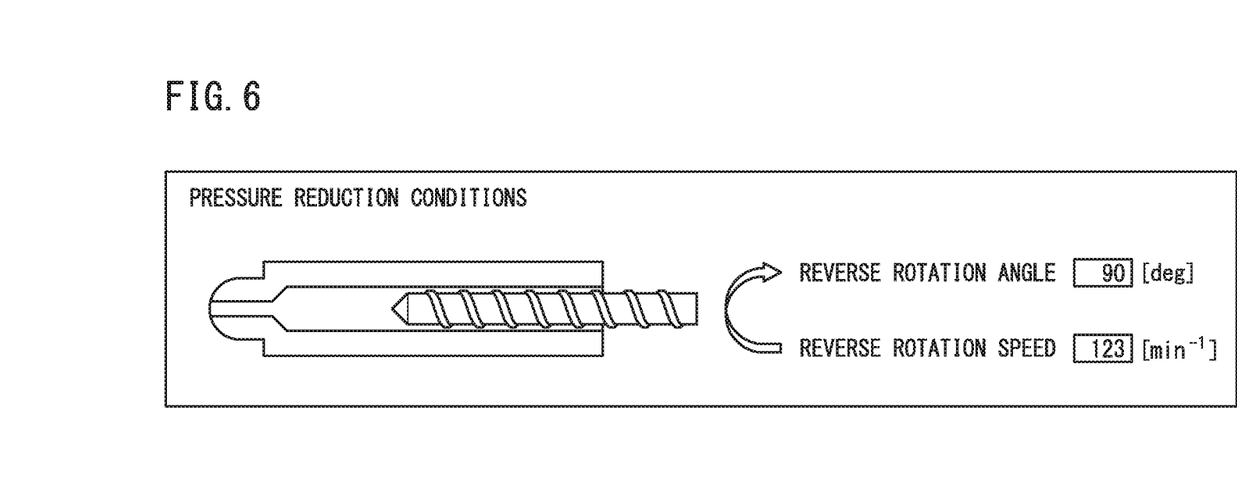
FIG. 6 is a diagram showing an example of a display on a display unit.
Figure 7:
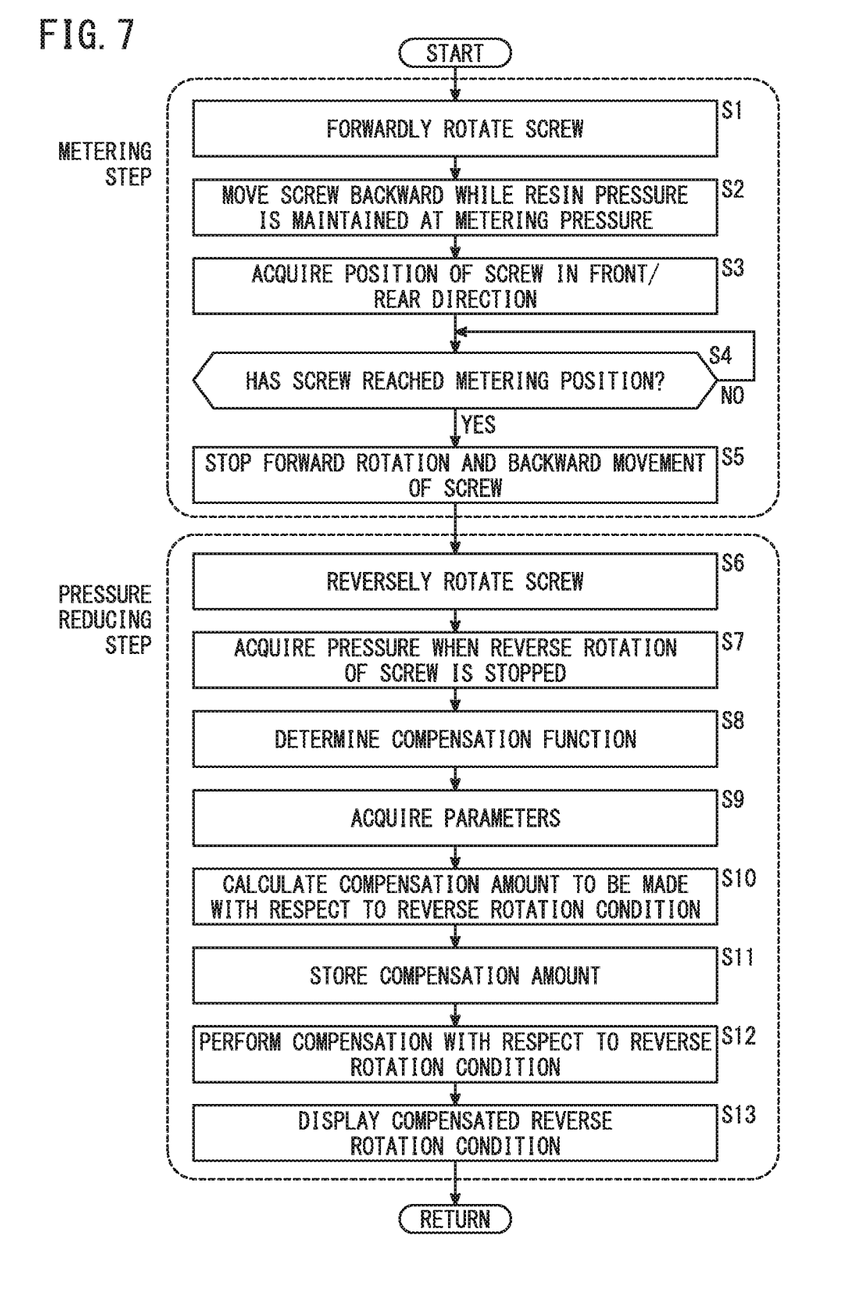
FIG. 7 is a flowchart showing an example of operations of the control device of the injection molding machine according to the embodiment.

The display control unit 84 can display various information on the display unit 66. For example, the display control unit 84 can cause the compensation amount calculated by the compensation amount calculation unit 78 to be displayed on the display unit 66. Further, the display control unit 84 can cause the compensated reverse rotation condition to be displayed on the display unit 66. FIG. 6 is a diagram showing an example of a display on the display unit. FIG. 6 shows an example of a case in which pressure reduction conditions, that is, the reverse rotation condition, is displayed. More specifically, in FIG. 6, an example is shown in which the compensated reverse rotation condition is displayed on the display unit 66. As shown in FIG. 6, for example, a reverse rotation angle, and more specifically, an amount of rotation when the screw 28 is rotated in reverse can be displayed on the display unit 66. Further, for example, a reverse rotational speed, and more specifically, a speed of rotation when the screw 28 is rotated in reverse can be displayed on the display unit 66. A description will be given below with reference to FIG. 7 concerning the configuration of the control device of the injection molding machine according to the present embodiment. FIG. 7 is a flowchart showing an example of operations of the control device of the injection molding machine according to the present embodiment. The metering step is constituted by steps S1 to S5. The pressure reducing step is constituted by steps S6 to S13.

In step S1, based on the metering conditions, the metering control unit 74 causes the screw 28 to be forwardly rotated. The metering conditions can be read out from the metering condition storage unit 94. Thereafter, the process transitions to step S2.

In step S2, the metering control unit 74 causes the screw 28 to be moved rearward while the resin pressure is maintained at the metering pressure P1. Thereafter, the process transitions to step S3.

In step S3, the metering control unit 74 acquires the position of the screw 28 in the longitudinal (front-rear) direction. Thereafter, the process transitions to step S4. In step S4, a determination is made as to whether or not the screw 28 has arrived at the metering position. In the case that the screw 28 has arrived at the metering position (YES in step S4), the process transitions to step S5. In the case that the screw 28 has not arrived at the metering position (NO in step S4), step S4 is repeated.

In step S5, the metering control unit 74 causes the forward rotation and the rearward movement of the screw 28 to be stopped. Thereafter, the process transitions to step S6.

In step S6, the reverse rotation control unit 76 causes the screw 28 to be rotated in reverse on the basis of the reverse rotation condition. The reverse rotation condition can be read out from the reverse rotation condition storage unit 96. Thereafter, the process transitions to step S7.

In step S7, the pressure acquisition unit 72 acquires the resin pressure when the reverse rotation of the screw 28 is stopped. Thereafter, the process transitions to step S8.

In step S8, the determination unit 82 determines one from among the plurality of compensation functions defined in the compensation function table 100 depending on the resin pressure. Thereafter, the process transitions to step S9.

In step S9, by referring to the parameter tables 102, the determination unit 82 acquires the parameters A and B, which depend on the machine type of the injection molding machine 10 or the diameter of the screw 28. Consequently, the parameters A and B of the compensation function are determined. Thereafter, the process transitions to step S10.

In step S10, the compensation amount calculation unit 78 calculates the compensation amount to be made with respect to the reverse rotation condition. More specifically, the compensation amount calculation unit 78 calculates the compensation amount to be made with respect to the reverse rotation condition, on the basis of the resin pressure acquired by the pressure acquisition unit 72 when the reverse rotation of the screw 28 is stopped, and the compensation function. Thereafter, the process transitions to step S11.

In step S11, the compensation amount calculation unit 78 stores the calculated compensation amount in the compensation amount storage unit 90. Thereafter, the process transitions to step S12.

In step S12, the compensation processing unit 80 performs a compensation with respect to the reverse rotation condition in the following manner. More specifically, first, the compensation processing unit 80 reads out from the compensation amount storage unit 90 the compensation amount calculated by the compensation amount calculation unit 78. Further, the compensation processing unit 80 reads out from the reverse rotation condition storage unit 96 the reverse rotation condition at the current time of injection molding. Based on the compensation amount read out from the compensation amount storage unit 90, the compensation processing unit 80 compensates the reverse rotation condition that was read out from the reverse rotation condition storage unit 96. The compensation processing unit 80 stores the reverse rotation condition that was obtained by the compensation, in the reverse rotation condition storage unit 96. In this manner, the reverse rotation condition is updated. The compensated reverse rotation condition, that is, the updated reverse rotation condition can be used at the next time of injection molding. Thereafter, the process transitions to step S13.

In step S13, the display control unit 84 displays the compensated reverse rotation condition on the display unit 66. Upon doing so, the process shown in FIG. 7 is brought to an end.

Figure 8A:
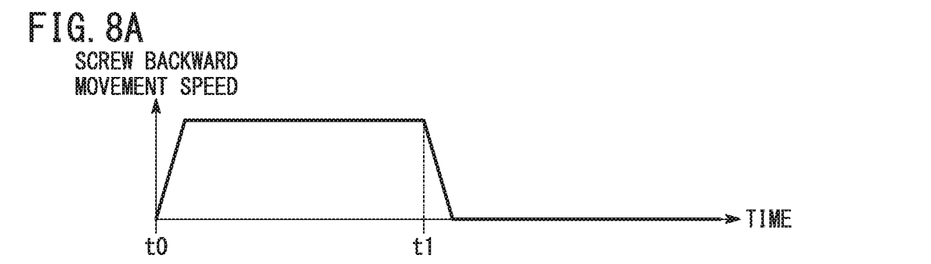
FIGS. 8A, 8B, 8C, 8D, and 8E are timing charts showing an example of operations of the control device of the injection molding machine according to the embodiment.
Figure 8B:
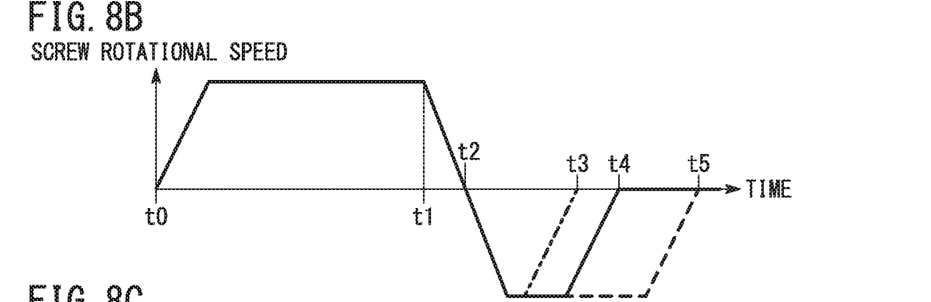
Figure 8C:
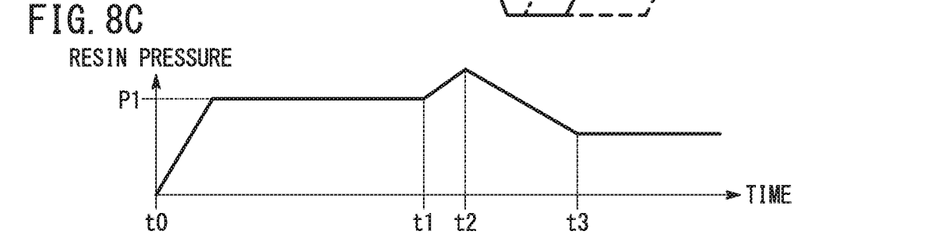
Figure 8D:
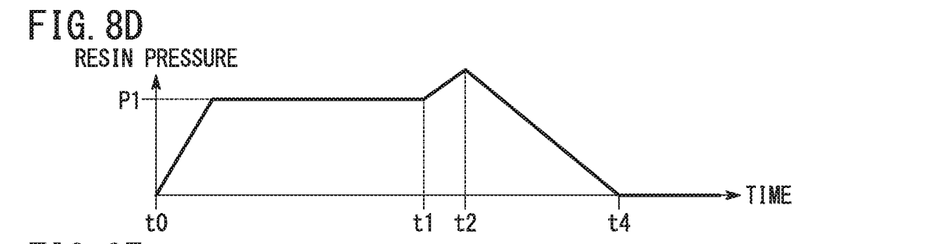
Figure 8E:
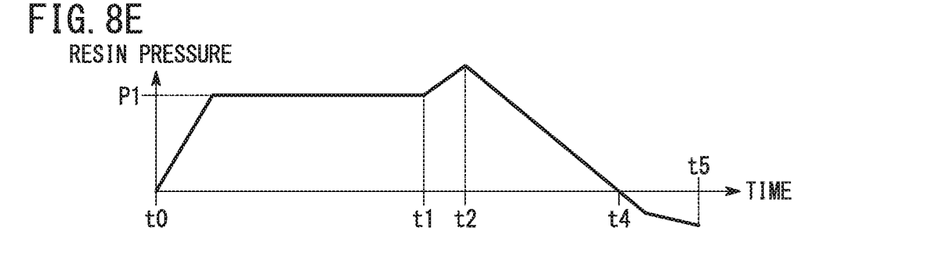

FIGS. 8A to 8E are timing charts showing an example of operations of the control device of the injection molding machine according to the present embodiment. FIG. 8A shows an example of the rearward (backward) movement speed of the screw 28. FIG. 8B shows an example of the rotational speed of the screw 28. FIGS. 8C to 8E show examples of the resin pressure. FIG. 8C shows an example in which the resin pressure when the pressure reducing step is completed is excessively high. FIG. 8D shows an example in which the resin pressure when the pressure reducing step is completed is appropriate. FIG. 8E shows an example in which the resin pressure when the pressure reducing step is completed is excessively low. The horizontal axis in FIGS. 8A to 8E represents time. The vertical axis in FIG. 8A represents the rearward (backward) movement speed of the screw 28. The vertical axis in FIG. 8B represents the rotational speed of the screw 28. The vertical axis in FIGS. 8C to 8E represents the resin pressure.

Timing t0 indicates a timing at which the metering step is started. As shown in FIG. 8A, the rearward movement speed of the screw 28 starts to rise at timing t0. As shown in FIG.

8B, the rotational speed of the screw 28 starts to rise at timing t0. Further, as shown in FIGS. 8C to 8E, the resin pressure starts to rise at timing t0. Thereafter, as shown in FIG. 8B, the rotational speed of the screw 28 reaches the metering rotational speed specified by the metering conditions. Further, as shown in FIGS. 8C to 8E, the resin pressure reaches the metering pressure P1 specified by the metering conditions. The rearward movement speed of the screw 28 is controlled in a manner so that the resin pressure is maintained at the metering pressure P1. Timing t1 indicates a timing at which the screw 28 arrives at the metering position.

As shown in FIG. 8A, after timing t1, the reverse movement speed of the screw 28 rapidly decreases, and eventually the reverse movement speed of the screw 28 becomes zero. Further, as shown in FIG. 8B, after timing t1, the rotational speed of the screw 28 rapidly decreases, and eventually the rotational speed of the screw 28 becomes zero. Timing t2 is a timing at which the rotational speed of the screw 28 becomes zero. The period from timing t0 to timing t2 corresponds to the metering step. During the period from timing t1 to timing t2, as shown in FIGS. 8C to 8E, the resin pressure rises. The reason why the resin pressure rises in this manner during the period from timing t1 to timing t2 is because the resin is continuously fed and compressed. Therefore, an amount of resin in excess of an appropriate amount becomes accumulated in a location on the front side (metering region) with respect to the check seat 48.

As shown in FIG. 8B, the reverse rotation of the screw 28 is started at timing t2. Therefore, as shown in FIGS. 8C to 8E, after timing t2, the resin pressure gradually decreases. When the screw 28 is rotated in reverse, a reverse flow of the resin takes place inside the cylinder 26, and the amount of resin in the metering region approaches the appropriate amount. In this manner, the pressure reducing step is performed.

As indicated by the one-dot-dashed line in FIG. 8B, in the case that the reverse rotation of the screw 28 is stopped at a comparatively early timing t3, then as shown in FIG. 8C, the resin pressure becomes excessively high at the time when the reverse rotation of the screw 28 is stopped.

As indicated by the solid line in FIG. 8B, in the case that the reverse rotation of the screw 28 is stopped at an appropriate timing t4, then as shown in FIG. 8D, the resin pressure when the reverse rotation of the screw 28 is stopped becomes appropriate.

As indicated by the dashed line in FIG. 8B, in the case that the reverse rotation of the screw 28 is stopped at a comparatively late timing t5, then as shown in FIG. 8E, the resin pressure becomes excessively low at the time when the reverse rotation of the screw 28 is stopped.

As shown in FIG. 8C, in the case that the resin pressure is excessively high when the reverse rotation of the screw 28 is stopped, the reverse rotation condition is compensated in a manner so that the resin pressure becomes lower when the reverse rotation of the screw 28 is stopped. For example, in the case that the amount of rotation of the screw 28 is specified by the reverse rotation condition, the reverse rotation condition can be compensated so that the amount of rotation of the screw 28 is made larger. Further, in the case that the rotational acceleration of the screw 28 is specified by the reverse rotation condition, the reverse rotation condition can be compensated so that the rotational acceleration of the screw 28 is made larger. Further, in the case that the rotational speed of the screw 28 is specified by the reverse rotation condition, the reverse rotation condition can be compensated so that the rotational speed of the screw 28 is made larger. Further, in the case that the time for which the screw 28 rotates is specified by the reverse rotation condition, the reverse rotation condition can be compensated so that the time for which the screw 28 rotates is made longer.

As shown in FIG. 8D, in the case that the resin pressure when the reverse rotation of the screw 28 is stopped is appropriate, a compensation with respect to the reverse rotation condition becomes unnecessary.

As shown in FIG. 8E, in the case that the resin pressure is excessively low when the reverse rotation of the screw 28 is stopped, the reverse rotation condition is compensated in a manner so that the resin pressure becomes higher when the reverse rotation of the screw 28 is stopped. For example, in the case that the amount of rotation of the screw 28 is specified by the reverse rotation condition, the reverse rotation condition can be compensated so that the amount of rotation of the screw 28 is made smaller.

Further, in the case that the rotational acceleration of the screw 28 is specified by the reverse rotation condition, the reverse rotation condition can be compensated so that the rotational acceleration of the screw 28 is made smaller. Further, in the case that the rotational speed of the screw 28 is specified by the reverse rotation condition, the reverse rotation condition can be compensated so that the rotational speed of the screw 28 is made smaller. Further, in the case that the time for which the screw 28 rotates is specified by the reverse rotation condition, the reverse rotation condition can be compensated so that the time for which the screw 28 rotates is made shorter.

In this manner, according to the present embodiment, based on the resin pressure inside the cylinder 26 acquired by the pressure acquisition unit 72 when the reverse rotation of the screw 28 is stopped, and the predetermined compensation function, the compensation amount to be made with respect to the reverse rotation condition is calculated. In addition, the reverse rotation condition is compensated based on the calculated compensation amount. Therefore, in accordance with the present embodiment, it is possible to carry out reverse rotation of the screw 28 under an appropriate reverse rotation condition, and thus, it is possible to prevent the occurrence of defective moldings. Therefore, in accordance with the present embodiment, it is possible to provide the control device 20 for the injection molding machine 10, which enables a satisfactory molded product to be obtained.

Although preferred embodiments of the present invention have been described above, the present invention is not limited to the above-described embodiments, and various modifications can be made thereto within a range that does not depart from the essence and gist of the present invention.

For example, in the above-described embodiment, an exemplary case has been described in which the injection molding machine 10 is an in-line injection molding machine, however, the present invention is not limited to this feature. For example, the injection molding machine 10 may be a preplasticating type injection molding machine (a screw preplasticating type injection molding machine).

Further, in the above-described embodiment, an exemplary case has been described in which the first drive device 32 is provided with the servomotor 52*a*, and the second drive device 34 is provided with the servomotor 52*b*, however, the present invention is not limited to this feature. For example, the first drive device 32 may comprise a hydraulic cylinder, a hydraulic motor, or the like. Further, the second drive device 34 may comprise a hydraulic cylinder, a hydraulic motor, or the like.

The above-described embodiments can be summarized as follows.

The control device (20) for the injection molding machine (10) is provided. The injection molding machine includes the cylinder (26) into which the resin is supplied, and the screw (28) configured to move forward and rearward and rotate inside the cylinder, the injection molding machine being configured to perform a metering of the resin while the resin is being melted inside the cylinder, by causing the screw to be moved rearward to a predetermined metering position while being forwardly rotated. The control device includes the pressure acquisition unit (72) configured to acquire the resin pressure inside the cylinder, the reverse rotation control unit (76) configured to cause the screw to be rotated in reverse based on the predetermined reverse rotation condition so as to reduce the resin pressure, after having moved the screw rearward to the metering position, the compensation amount calculation unit (78) configured to calculate the compensation amount to be made with respect to the reverse rotation condition, based on the resin pressure inside the cylinder acquired by the pressure acquisition unit when the reverse rotation of the screw is stopped, and the predetermined compensation function, and the compensation processing unit (80) configured to compensate the reverse rotation condition based on the compensation amount calculated by the compensation amount calculation unit. In accordance with such a configuration, based on the resin pressure inside the cylinder acquired by the pressure acquisition unit when the reverse rotation of the screw is stopped, and the predetermined compensation function, the compensation amount to be made with respect to the reverse rotation condition is calculated. In addition, the reverse rotation condition is compensated based on the calculated compensation amount. Therefore, in accordance with such a configuration, it is possible to carry out reverse rotation of the screw under an appropriate reverse rotation condition, and thus it is possible to prevent the occurrence of defective moldings. Therefore, in accordance with such a configuration, it is possible to provide the control device for the injection molding machine, which enables a satisfactory molded product to be obtained.

The compensation function may be a polynomial function or a rational function.

The control device may further include the compensation function table storage unit (86) configured to store the compensation function table (100) in which there are defined the plurality of compensation functions depending on the resin pressure, and the determination unit (82) configured to determine one compensation function from among the plurality of compensation functions depending on the resin pressure, wherein the compensation amount calculation unit may calculate the compensation amount using the compensation function determined by the determination unit. In accordance with such a configuration, since an appropriate compensation function selected from among the plurality of compensation functions is used, the compensation amount can be accurately calculated.

The control device may further include the parameter table storage unit (88) configured to store the parameter table (102a, 102b) in which there are defined the parameters (A, B) of the compensation function depending on the machine type of the injection molding machine or the diameter of the screw, wherein the compensation amount calculation unit may calculate the compensation amount using the compensation function in which there are used the parameters depending on the machine type of the injection molding machine or the diameter of the screw. In accordance with such a configuration, since parameters depending on the machine type of the injection molding machine or the diameter of the screw are used, the compensation amount can be accurately calculated in accordance with the machine type of the injection molding machine or the diameter of the screw.

The reverse rotation condition may specify at least one of an amount of rotation of the screw, a rotational acceleration of the screw, a rotational speed of the screw, and a time for which the screw rotates.

The control device may further include the compensation amount storage unit (90) configured to store the compensation amount calculated by the compensation amount calculation unit, wherein the compensation processing unit may determine, as the reverse rotation condition at a next time of injection molding, the reverse rotation condition obtained by compensating the reverse rotation condition at a current time of injection molding, based on the compensation amount stored in the compensation amount storage unit when the current time of injection molding is performed. In accordance with such a configuration, since the next time of injection molding is performed under an appropriate reverse rotation condition, it is possible to acquire a satisfactory molded product at the next time.

The control device may further include the display control unit (84) configured to display on the display unit (66) the compensation amount, or the compensated reverse rotation condition. In accordance with such a configuration, it is possible for the user to grasp and understand the compensation amount, or the compensated reverse rotation condition.

The control method for an injection molding machine is characterized by a method of controlling an injection molding machine. The injection molding machine includes the cylinder into which the resin is supplied, and the screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated. The control method includes the step (step S6) of causing the screw to be rotated in reverse based on the predetermined reverse rotation condition so as to reduce the resin pressure, after having moved the screw rearward to the metering position, the step (step S7) of acquiring the resin pressure inside the cylinder when the reverse rotation of the screw is stopped, the step (step S10) of calculating the compensation amount to be made with respect to the reverse rotation condition, based on the resin pressure inside the cylinder acquired when the reverse rotation of the screw is stopped, and the predetermined compensation function, and the step (step S12) of compensating the reverse rotation condition based on the calculated compensation amount.

The compensation function may be a polynomial function or a rational function.

The compensation function table in which there are defined the plurality of compensation functions depending on the resin pressure may be stored in the compensation function table storage unit, and the control method may further include the determination step (step S8) of determining one compensation function from among the plurality of compensation functions stored in the compensation function table, depending on the resin pressure, wherein, in the step of calculating the compensation amount, the compensation amount may be calculated using the compensation function determined in the determination step.

The parameter table in which there are defined the parameters of the compensation function depending on the machine type of the injection molding machine or the diameter of the screw is stored in a parameter table storage unit, and the control method may further include the acquisition step (step S9) of acquiring, based on the parameter table, the parameters of the compensation function depending on the machine type of the injection molding machine or the diameter of the screw, wherein, in the step of calculating the compensation amount, the compensation amount may be calculated using the compensation function in which there are used the parameters acquired in the acquisition step.

The reverse rotation condition may specify at least one of an amount of rotation of the screw, a rotational acceleration of the screw, a rotational speed of the screw, and a time for which the screw rotates.

The control method may further include the step (step S11) of storing the calculated compensation amount in the compensation amount storage unit, wherein, the step of compensating the reverse rotation condition may include determining, as the reverse rotation condition at a next time of injection molding, the reverse rotation condition obtained by compensating the reverse rotation condition at a current time of injection molding, based on the compensation amount stored in the compensation amount storage unit when the current time of injection molding is performed.

The control method may further include the step (step S13) of displaying the calculated compensation amount on the display unit.

What is claimed is:

1. An injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the injection molding machine comprising:
   a control device including:
      a computation unit configured by a processor; and
      a storage unit, the storage unit storing instructions to cause the processor to control:
         a pressure acquisition unit configured to acquire a resin pressure inside the cylinder;
         a reverse rotation control unit configured to cause the screw to be rotated in reverse based on a predetermined reverse rotation condition so as to reduce the resin pressure, after having moved the screw rearward to the metering position;
         a compensation amount calculation unit configured to calculate a compensation amount to be made with respect to the reverse rotation condition, based on the resin pressure inside the cylinder acquired by the pressure acquisition unit when the reverse rotation of the screw is stopped, and a predetermined compensation function; and
         a compensation processing unit configured to:
            compensate the reverse rotation condition based on the compensation amount calculated by the compensation amount calculation unit; and
            determine, as the reverse rotation condition at a next time of injection molding, the reverse rotation condition obtained by compensating the reverse rotation condition at a current time of injection molding;
   a first drive device configured to rotate the screw; and
   a second drive device configured to move the screw,
   wherein the control device is further configured to send control signals to the first drive device instructing the first drive device to rotate the screw, and
   wherein the control device is further configured to send control signals to the second drive device instructing the second drive device to move the screw.

2. The injection molding machine according to claim 1, wherein the compensation function is a polynomial function or a rational function.

3. The injection molding machine according to claim 1, wherein the storage unit further stores instructions to cause the processor to control:
   a compensation function table storage unit configured to store, within the storage unit, a compensation function table in which there are defined a plurality of the compensation functions depending on the resin pressure; and
   a determination unit configured to determine one compensation function from among the plurality of compensation functions depending on the resin pressure;
   wherein the compensation amount calculation unit calculates the compensation amount using the compensation function determined by the determination unit.

4. The injection molding machine according to claim 1, wherein the storage unit further stores instructions to cause the processor to control a parameter table storage unit configured to store a parameter table in which there are defined parameters of the compensation function depending on a machine type of the injection molding machine or a diameter of the screw,
   wherein the compensation amount calculation unit calculates the compensation amount using the compensation function in which there are used the parameters depending on the machine type of the injection molding machine or the diameter of the screw.

5. The injection molding machine according to claim 1, wherein the reverse rotation condition specifies at least one of an amount of rotation of the screw, a rotational acceleration of the screw, a rotational speed of the screw, and a time for which the screw rotates.

6. The injection molding machine according to claim 1, further comprising a display control unit configured to display on a display unit the compensation amount, or the compensated reverse rotation condition.

7. The injection molding machine according to claim 1, wherein the screw includes a pressure sensor, and
   wherein the pressure acquisition unit sequentially acquires the pressure acquired by the pressure sensor.

8. The injection molding machine according to claim 1, wherein the reverse rotation condition is user specified.

9. An injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the injection molding comprising:
   a control device including:
      a computation unit configured by a processor; and
      a storage unit, the storage unit storing instructions to cause the processor to control:
         a pressure acquisition unit configured to acquire a resin pressure inside the cylinder;
         a reverse rotation control unit configured to cause the screw to be rotated in reverse based on a predetermined reverse rotation condition so as to reduce the resin pressure, after having moved the screw rearward to the metering position;

a compensation amount calculation unit configured to calculate a compensation amount to be made with respect to the reverse rotation condition, based on the resin pressure inside the cylinder acquired by the pressure acquisition unit when the reverse rotation of the screw is stopped, and a predetermined compensation function;

a compensation processing unit configured to compensate the reverse rotation condition based on the compensation amount calculated by the compensation amount calculation unit; and a compensation amount storage unit configured to store the compensation amount calculated by the compensation amount calculation unit;

a first drive device configured to rotate the screw; and a second drive device configured to move the screw, wherein the compensation processing unit determines, as a reverse rotation condition at a next time of injection molding, a reverse rotation condition obtained by compensating the reverse rotation condition at a current time of injection molding, based on the compensation amount stored in the compensation amount storage unit when the current time of injection molding is performed, wherein the control device is further configured to send control signals to the first drive device instructing the first drive device to rotate the screw, and wherein the control device is further configured to send control signals to the second drive device instructing the second drive device to move the screw.

10. A method of controlling an injection molding machine including a cylinder into which a resin is supplied, and a screw configured to move forward and rearward and rotate inside the cylinder, the injection molding machine being configured to perform a metering of the resin while the resin is being melted inside the cylinder, by causing the screw to be moved rearward to a predetermined metering position while being forwardly rotated, the method comprising:

a step of causing the screw to be rotated in reverse based on a predetermined reverse rotation condition so as to reduce a resin pressure, after having moved the screw rearward to the metering position;

a step of acquiring the resin pressure inside the cylinder when the reverse rotation of the screw is stopped;

a step of calculating a compensation amount to be made with respect to the reverse rotation condition, based on the resin pressure inside the cylinder acquired when the reverse rotation of the screw is stopped, and a predetermined compensation function; and a step of compensating the reverse rotation condition based on the calculated compensation amount;

a step of determining, as the reverse rotation condition at a next time of injection molding, the reverse rotation condition obtained by compensating the reverse rotation condition at a current time of injection molding; and based on the resin pressure and the compensation amount, a step of sending control signals instructing the injection molding machine to rotate the screw and to move the screw.

11. The method of controlling the injection molding machine according to claim 10, wherein the compensation function is a polynomial function or a rational function.

12. The method of controlling the injection molding machine according to claim 10, wherein a compensation function table in which there are defined a plurality of the compensation functions depending on the resin pressure is stored in a compensation function table storage unit, the method further comprising:

a determination step of determining one compensation function from among the plurality of compensation functions stored in the compensation function table, depending on the resin pressure;

wherein, in the step of calculating the compensation amount, the compensation amount is calculated using the compensation function determined in the determination step.

13. The method of controlling the injection molding machine according to claim 10, wherein a parameter table in which there are defined parameters of the compensation function depending on a machine type of the injection molding machine or a diameter of the screw is stored in a parameter table storage unit, the method further comprising:

an acquisition step of acquiring, based on the parameter table, the parameters of the compensation function depending on the machine type of the injection molding machine or the diameter of the screw;

wherein, in the step of calculating the compensation amount, the compensation amount is calculated using the compensation function in which there are used the parameters acquired in the acquisition step.

14. The method of controlling the injection molding machine according to claim 10, wherein the reverse rotation condition specifies at least one of an amount of rotation of the screw, a rotational acceleration of the screw, a rotational speed of the screw, and a time for which the screw rotates.

15. The method of controlling the injection molding machine according to claim 10, further comprising:

a step of storing the calculated compensation amount in a compensation amount storage unit;

wherein, the step of compensating the reverse rotation condition includes determining, as the reverse rotation condition at the next time of injection molding, the reverse rotation condition obtained by compensating the reverse rotation condition at the current time of injection molding, based on the compensation amount stored in the compensation amount storage unit when the current time of injection molding is performed.

16. The method of controlling the injection molding machine according to claim 10, further comprising a step of displaying the calculated compensation amount on a display unit.

* * * * *